United States Patent [19]

Matsuzaki et al.

[11] Patent Number: 4,805,547
[45] Date of Patent: Feb. 21, 1989

[54] ANCHOR FOR HOOKING, SEVERING AND HOLDING MARINE CABLE

[75] Inventors: Akira Matsuzaki; Yoshihiro Ejiri; Taiichiro Nakai; Yoshiro Yamaguchi, all of Tokyo, Japan

[73] Assignee: Kokusai Denshin Denwa Co., Ltd., Tokyo, Japan

[21] Appl. No.: 5,048

[22] Filed: Jan. 20, 1987

[30] Foreign Application Priority Data

Jan. 24, 1986 [JP] Japan ................................ 61-11847
Jan. 24, 1986 [JP] Japan ................................ 61-11848
Mar. 10, 1986 [JP] Japan ................................ 61-50563

[51] Int. Cl.⁴ .............................................. B26D 1/26
[52] U.S. Cl. .................................. 114/221 A; 405/156
[58] Field of Search .................... 114/221 A, 221 R; 83/639; 405/154, 156, 158, 173

[56] References Cited

U.S. PATENT DOCUMENTS

| 3,817,200 | 6/1974 | Hess | 114/221 A |
| 3,926,252 | 12/1975 | Ribeyre | 114/221 A |
| 4,120,246 | 11/1978 | Sabranski | 114/221 A |
| 4,463,496 | 8/1984 | Reich | 114/221 A |
| 4,557,628 | 12/1985 | Cowan | 83/639 |

Primary Examiner—Joseph F. Peters, Jr.
Assistant Examiner—Clifford T. Bartz
Attorney, Agent, or Firm—Jordan and Hamburg

[57] ABSTRACT

An anchor for hooking and cutting a submarine cable comprises an anchor body part, a cable-hooking part and a connecting part, these parts being connected together into a form like a fishing hook. A cable-sensing device is provided on the inner side of the connecting part and spring-biased in the floating-up direction. A cutting device is provided for cutting and holding the submarine cable by being advanced from the anchor body part by hydraulic pressure making use of a force such as sea water pressure or a tugging force for raising the submarine cable externally applied to the anchor body part when the cable-sensing device is caused to sink against the biasing force in the floating-up direction by receiving the tension in the cable hooked on the inner side of the connecting part.

24 Claims, 5 Drawing Sheets

ANCHOR FOR HOOKING, SEVERING AND HOLDING MARINE CABLE

FIELD OF THE INVENTION

This invention relates to an anchor for hooking, cutting and holding a submarine cable to be used for searching a submarine cable and recovering it onto a ship for repair when it is damaged or ruptured.

DESCRIPTION OF THE PRIOR ART

Generally, the submarine cable is laid with a redundancy of several percent of the actual distance, over which the cable is laid (hereinafter referred to as redundant length), in order that the laid cable is in sufficiently close contact with the sea bed and stable.

To repair a submarine cable, a damaged portion of the cable is electrically measured from the land. Then a cable ship is dispatched to the corresponding position. A cable searching anchor is then lowered into the sea to reach the sea bottom, and then it is tugged so as to hook the cable. In this state, the cable is raised and recovered into the ship.

The length of cable that is necessary to raise the cable up to the ship is obtained from the redundant length noted above. When the redundant length is 5% of the distance, over which the cable is laid, a cable portion as long as about seven times the sea depth has to be suspended in the sea to recover the cable onto the ship.

Where the sea is shallow, the cable can be raised in the suspended state. Where the sea depth is several thousand meters, however, excessive tension is applied to the cable due to the weight of cable in water while the cable is raised. Therefore the cable is broken apart or, if not so, elongated beyond the permissible value.

Meanwhile, it is certain that future submarine cable systems will adopt an optical communication system using an optical submarine cable α, as shown in the sectional view of FIG. 5, which uses optical fibers β as a transmission medium. The optical fibers β are made of silica glass, and they are very thin, with a diameter of approximately 0.1 mm. Therefore, it is weak with respect to externally applied tensile force. That is, when it is pulled, it may be broken apart or, even if it is not broken, microscopic damages will occur on its surface so that after removal of the tensile force the damages will continue to occur to eventually result in breakage. In other words, when excessive force is applied to the optical fiber β, the mechanical reliability is reduced. For the above reasons, the raising of the optical fiber submarine cable α requires a technique of minimizing the tension applied to the cable α and the length of cable, over which the tension is applied.

As a preferable technique of this kind, there is a method in which, when the cable is hooked in the hooking section of a cable-searching anchor, one cut portion of the cable is left on the sea bed, and the other portion is raised by operating the ship such that the cable becomes substantially vertical.

At present, as a cable-searching anchor capable of holding and cutting a cable α as noted above, there is one manufactured by BTI Inc. in England. With this anchor, however, the cable once hooked is wound on a shaft. Therefore, it is large in size (typically having a length of about 3.5 m, a width of about 1 m and a weight of about 25 tons), so that it can only be handled inconveniently. Also, it is large in size, and the probability of hooking the cable may be reduced in case where the sea bed has irregular surfaces constituted by rock, gravel, a coral reef, etc.

SUMMARY OF THE INVENTION

An object of the invention is to provide an anchor for hooking and cutting a submarine cable, which makes use of external forces such as tension and hydraulic pressure applied to it and which has high-cable hooking probability with respect to any character of the sea bed as well as being simple in construction and small in size.

Another object of the invention is to provide an anchor for hooking, cutting and holding a submarine cable, which makes use of tension applied to its when raising the cable and which has high cable-hooking probability with respect to any character of the sea bed as well as being simple is construction and small in size.

A further object of the invention is to provide an anchor hooking, cutting and holding a submarine cable, which makes use of the sea water hydraulic pressure at the sea bed and which has high cable-hooking probability with respect to any sea bed character as well as being simple in construction and small in size.

The above and other objects of the invention will become more apparent with reference to the specification and drawings.

DETAILED DESCRIPTION OF THE PREFERRED EMBODIMENTS

Figure 1:
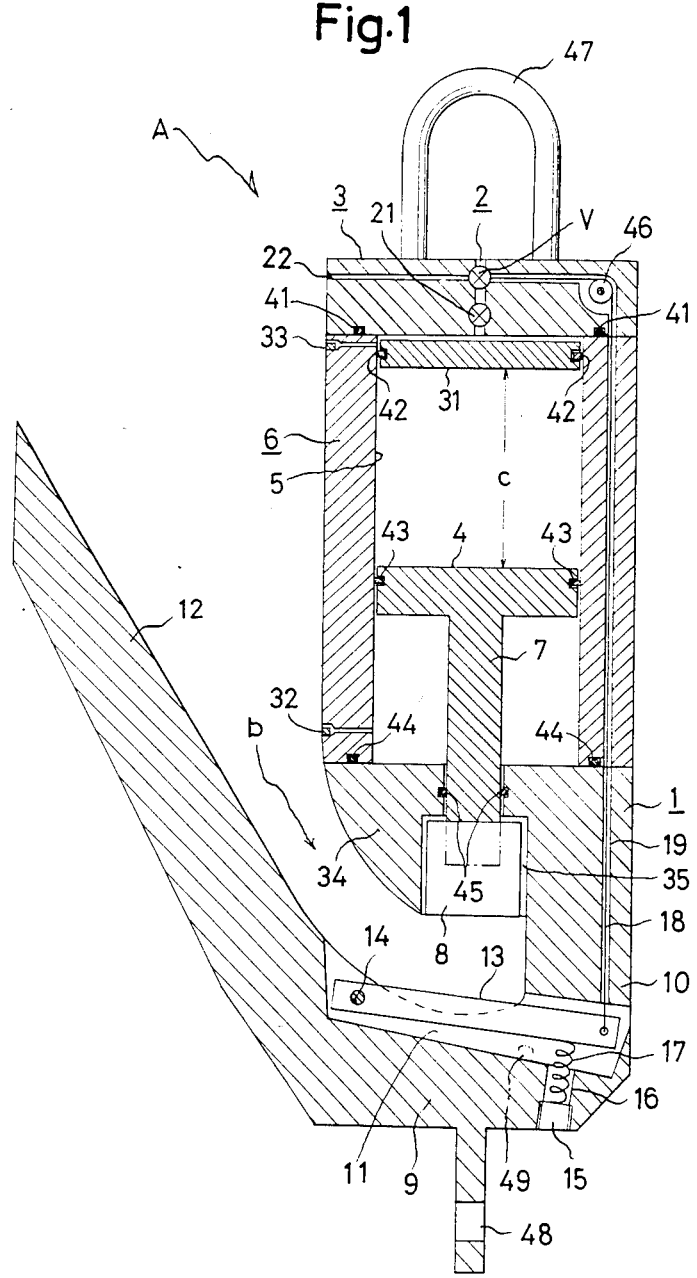
FIG. 1 is an elevational sectional view showing a first embodiment of the invention.

An anchor for hooking, cutting and holding a submarine cable according to the invention comprises an anchor body part, a cable-hooking part and a connecting part, these parts being connected together into a form like a fishing hook, the anchor further comprising cable-sensing means provided on the inner side of the connecting part and spring-biased in the floating-up direction and cutting means for cutting and holding the submarine cable and being advanced from the anchor body part by a fluid pressure making use of a force externally applied to the anchor body part when the cable-sensing means is caused to sink against the biasing force in the floating-up direction by receiving the cable tension when the cable is hooked on the inner side of the connecting part.

An anchor cable for hooking, cutting and holding a submarine cable according to the invention in case when sea water pressure is utilized as an external force applied to the anchor body part is such that a connecting portion of the cable-receiving part provided with a cable-sensing plate spring-biased in the floating-up direction such as to sink by receiving the cable tension when it is hooked on the inner side of a hook portion is provided integrally with the lower end of an intermediate portion having a cylinder chamber accommodating a piston actuated by a hydraulic pressure of sea water entering the cylinder chamber through a sea water inlet port, a cutter/holder is secured to the outer end of a piston rod accommodated in the cylinder chamber and penetrating the connecting part, the cutter/holder being found in the connecting part such that it faces the cable-sensing plate and including a cutting blade for cutting the hooked cable when it is advanced with the operation of the piston and also a holding pawl for holding one of the cut cable portions, and the sea water inlet port is provided with an on-off valve opened in a timed relation to the sinking of the cable-sensing plate, and when the cable-sensing plate is caused to sink by the cable hooked and lead into the hook portion against the biasing force in the floating-up direction, the on-off valve is opened and then the cutter/holder moved by the operation of the piston cuts the cable and holds one of the cut cable portions, and held cable portion being raised and recovered onto the cable ship.

Another anchor for hooking, cutting and holding a submarine cable according to the invention in case when sea water pressure is utilized as an external force applied to the anchor body part, is such that an anchor body part including a first piston-cylinder mechanism having a check valve and a floating piston for converting sea water pressure into a necessary hydraulic pressure and a second piston-cylinder mechanism having a cutting blade for cutting and holding the hooked cable with the hydraulic pressure, a cable-hooking part and a connecting part are connected together into a form like a fishing hook, the cutting blade is capable of being advanced from the inner side of the anchor body part to be brought into contact with a cable-sensing block sidewise of the block, the block being found inside the connecting part and spring-biased in the direction of projecting from the connecting part, and when the cable-sensing block is pushed in against the biasing force by the cable hooked and guided between the anchor body part and cable-hooking part, the cutting blade is advanced by the action of transmission of pressure from the first piston-cylinder mechanism to the second piston-cylinder mechanism to cut the cable and hold one of the cut cable portions, the held cable portion being raised and recovered onto the ship.

An anchor for hooking, cutting and holding a submarine cable according to the invention in case when the raising tension when raising the cable is utilized as an external force applied to the anchor body part, is such that an anchor body part including a first piston-cylinder mechanism for converting the tension applied to the anchor into a hydraulic pressure, a second piston-cylinder mechanism having two different diameters and provided at an outer end with a cutting blade for cutting and holding the hooked cable with the hydraulic pressure and a pressure storage unit for automatically adjusting the hydraulic pressure, maintaining the force with which the cable is held and pushed against by the cutting blade and limiting the maximum pushing force, a cable-hooking part and a connecting part are connected together into a form like a fishing hook, the cutting blade is capable of being advanced from the inner side of the anchor body part to be brought into contact with a cable-sensing block sidewise of the block, the block being found inside the connecting part and spring-biased in the direction of projecting from the connecting part, and when cable-sensing block is pushed in against the biasing force by the cable hooked and guided between the anchor body part and cable-hooking part, the cutting blade is advanced by the action of transmission of pressure from the first piston-cylinder mechanism to the second piston-cylinder mechanism to cut the cable and hold one of the cut cable portions, the held cable portion being raised and recovered onto the cable ship.

Now, an embodiment of the invention will be described with reference to FIGS. 1 to 4.

Referring to the Figures, there is shown an anchor A for hooking, cutting and holding a submarine cable according to the invention. The anchor A comprises a cable-hooking part 1 having a shape like a fishing hook for guiding and hooking a cable $\alpha$ in a bosom b, a lid part 3 with a sea water inlet port 2 formed in a central portion, a cylindrical intermediate part 6 provived between the parts 1 and 3. The intermediate part 6 has a cylinder chamber 5, in which a main piston 4 is actuated by receiving the pressure of sea water entering the chamber 5. A floating pistion 31 is also axially slid into the cylinder chamber 5. The piston 4 has a piston rod 7 which penetrates an upper portion of the cable-hooking part 1, and a cutter/holder 8 is arranged to the lower end of the projecting portion of the piston rod 7.

The cable-hooking part 1 has a plate accommodation groove of recess 11, which extends along the inner side of a hook-like portion 9 to a vertical portion 10 for hooking the cable $\alpha$. A cable-sensing plate 13 is accommodated in the plate accommodation recess 11. The plate 13 is pivoted at one end nearer an inclined end portion 12 of the part 1 by a pin 14 to the part 1. The underside of the other end of the cable-sensing plate 13 is in contact with a coil spring 17 accommodated in a spring accommodation hole 16. A seal member 15 is screwed in a bottom portion of the hole 16. The other end of the cable-sensing plate 13 is thus spring-biased upwardly, i.e., in the floating-up direction. A wire 18 is connected at the lower end to the other end of the cable-sensing plate. The connecting wire 18 is led through a wire guide hole 19, which is formed in the vertical portion 10 and extends through the back wall of the cylindrical intermediate portion 6 to be led to the lid part 3.

Figure 2:
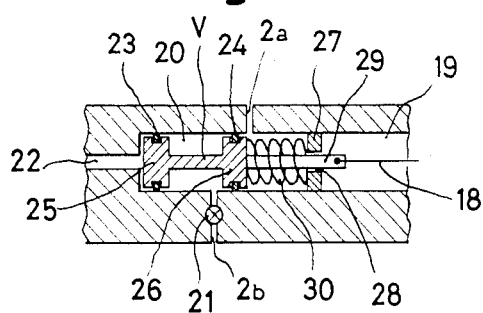
FIG. 2 is a fragmentary enlarged-scale sectional view showing a lid of the first embodiment of the invention.

The lid part 3 has the sea water inlet port 2 formed in the central portion as noted before. As shown in FIG. 2, has an upper inlet port 2a, a valve chamber 20 accommodating an on-off valve V and a lower inlet port 2b with a check valve 21 therein. The valve chamber 20 communicates at the right end to the wire guide hole 19, through which the connecting wire 18 is led, and communicates at the left end with a hole 22 opened to the outside of the lid part 3. The valve V arranged in the valve accommodation chamber 20 consists of ganged left and right valve members 25 and 26 being integrated with each other and movable to the left and right. O-rings 23 and 24 are fitted on the respective valve members 25 and 26. The valve chamber 20 is partitioned by a spring retainer wall 27 having a hole 28, through which a valve rod 29 penetrates. The upper end of the connecting wire 18 noted above is connected to the end of the valve rod 29 projecting from the spring retainer wall 27. A coil spring 30 is provided between the right valve member 26 and spring retainer wall 27 to bias the valve V to the left.

As noted before, the floating piston 31 is axially slidably fitted in the cylinder chamber 5 of the cylindrical intermediate portion 6, so that it can be moved downwards when it receives the hydraulic pressure of sea water through the sea water inlet port 2. The main piston 4 is also axially slidably fitted in the cylinder chamber 5 such that it is spaced apart by a suitable buffering distance C from the floating piston 31. The piston rod 7 extends downwards from the main piston 4. Reference numeral 32 designates an air purging plug for discharging air under the main piston 4 when setting the piston 4 to an initial position, and numeral 33 a water draining plug operable when resetting the main piston 4 and floating piston 31 to the initial positions.

Figure 3:
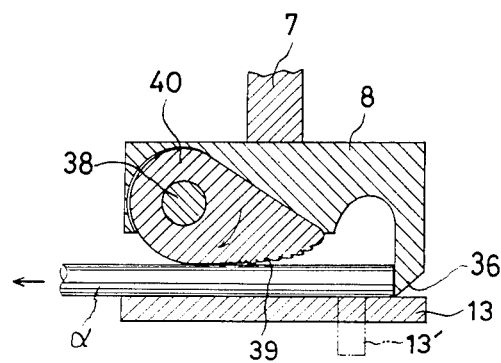
FIGS. 3 and 4 are respectively a sectional view taken along line III—III in FIG. 4 and a right side view showing a cutter/holder of the first embodiment of the invention.
Figure 4:
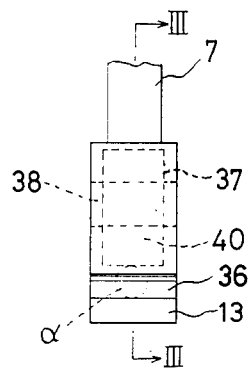
Figure 5:
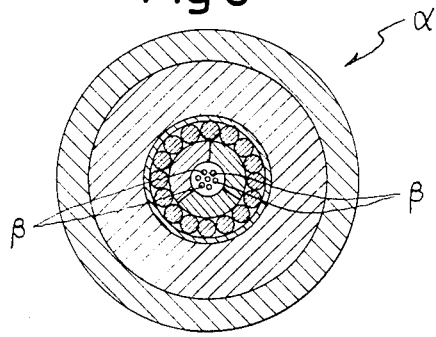
FIG. 5 is an enlarged-scale sectional view showing an optical submarine cable.

The cutter/holder 8 is attached to the lower end of the piston rod 7 penetrating an upper portion 34 of the cable-hooking part 1 sealingly connected to the lower open end of the intermediate part 6. Normally, it is held retreated in a recess 35 formed in the portion 34 and open downwards. As shown in FIGS. 3 and 4, the cutter/holder 8 has a cutting blade 36 projecting from one end toward the cable-sensing plate 13 and has a pawl accommodation space 37 formed at the other end. A holding pawl 40 is rotatably mounted on a pin 38 extending through the pawl accommodation recess 37. The holding pawl 40 has sawtooth-like irregularities 39 formed on the surface to be in contact with the cable α.

Reference numerals 41 to 45 designate O-rings, numeral 46 an intermediate roller in rolling contact with the connecting wire 18 to turn the direction thereof by right angles, numeral 47 a connector to be connected to a cable-searching rope or a preceding-stage anchor (neither being shown), and numeral 48 a connector to be connected to a next stage anchor (not shown).

In the first embodiment of the invention, the cable-sensing plate 13 and on-off valve V are mechanically interlocked to each other by connecting them using the connecting wire 18. However, this is by no means limitative. For example, it is possible to provide the bottom of the plate accommodation recess 11 with a contact 49, as shown by a dotted line in FIG. 1, replace the on-off valve V with an electromagnetic on-off valve and bury a power source (not shown) in a suitable place such that it is capable of replacement, so that when the cable-sensing plate 13 is urged by the cable α to be brought into contact with the contact 49, the electromagnetic on-off valve is electrically excited and opened in a synchronized fashion. Further, it is possible to convert the force tending to cause sinking of the cable-sensing plate 13 into an oil hydraulic pressure to operate the on-off valve.

With the above construction of the first embodiment of the invention, when the submarine cable α is hooked in the bosom b of the cable-searching/hooking part 1 and the ship is advanced in this state or the cable-searching rope is taken up into the ship, the hooked cable α reaches the cable-sensing plate 13, and the plate 13 is rotated in the clockwise direction about the pin 14 by the tension in the cable α against the biasing forces of the coil springs 17 and 30. With this rotation of the cable-sensing plate 13 the connecting wire 18 is pulled to cause displacement of the integral left and right valve members 25 and 26 in the valve accommodation chamber 20 to the right. When the right valve member 26 is moved to the right beyond the upper inlet port 2a, the inlet port 2 is opened, thus causing sea water to rush into the space of the cylinder chamber 5 above the floating piston 31. The floating piston 31 is thus lowered by receiving the hydraulic pressure of sea water. Since the buffering space C between the floating and main pistons 31 and 4 is perfectly water-tight owing to the O-rings 42 and 43, with the lowering of the floating piston 31 and the main piston 4 is also quietly lowered. The cutter/holder 8 attached to the lower end of the piston rod 7 of the main piston 4 is thus lowered in unison with the piston rod 7. That is, the cutter/holder 8 is gradually moved down from its position in the recess 35 to urge the cable α against the cable-sensing plate 13. Thus, the holding pawl 40 strikes the cable α, while the cutting blade 36 wedges into the cable α. The cable α is severed by the cutting blade 36 when a predetermined sea water pressure is reached. At this time, the cable α laid on the cable-sensing plate 13 tends to be moved in the direction of arrow in FIG. 3. However, since the cable α is geared with the sawtooth-like irregularities 39 of the holding pawl 40, the force tending to detach the cable α gives a clockwise torque as shown by arrow in FIG. 3 to the holding pawl 40. Thus, the cable α is pushed against the cable-sensing plate 13 in a state clamped between the holding pawl 40 and plate 13. Thus, the cable α can be raised and brought onto the ship together with the anchor A.

The floating piston 31 is arranged in order to provide the big volume of air which is varied greatly by application of pressure, to maintain stable cable-holding force irrespective of slight leakage of water through the check valve, temperature changes of the anchor, etc.

As has been shown, the anchor A for hooking, cutting and holding the marine cable according to the invention is simple in construction, small in size and it is possible to connect a plurality of anchors in series. High cable-capturing probability thus can be provided for various kind of sea bed. Further, the anchor can firmly hold the cut portion of cable against the cable-sensing plate by utilizing the force tending to cause detachment of the cable. Thus, the cut cable can be readily raised and brought into the ship without the possibility of being detached during the raising. Further, the main piston is not occasionally operated, but it is operated when and only when the cable-sensing plate receives tension in excess of a predetermined value in the cable hooked in the cable-hooking part.

In the above embodiment, the cable-sensing plate 13 faces the entire cable cutter/holder. However, the cable-sensing plate may face only part of the cable cutter/holder as shown by a dotted line 13' in FIG. 3, and rest, i.e., a major proportion, of the cable cutter/holder may face the bottom of the bosum of the cable-hooking part.

Figure 6:
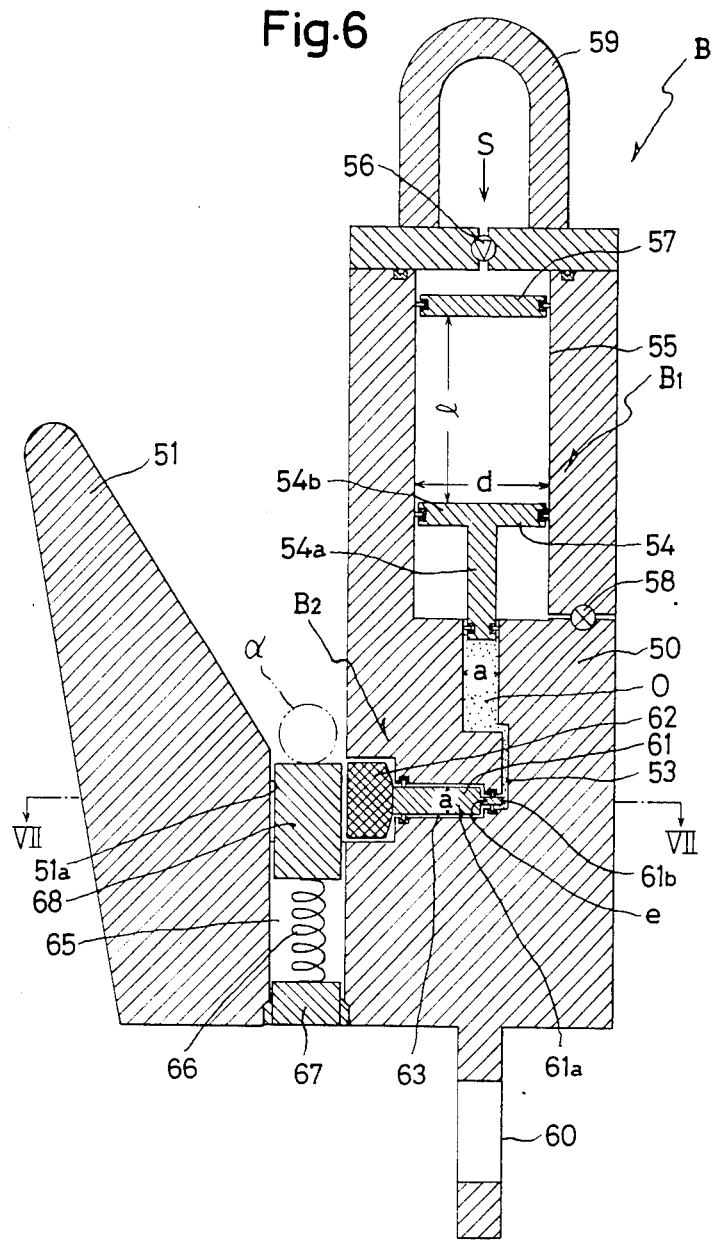
FIG. 6 is a partly elevational sectional view showing a second embodiment of the invention.
Figure 7:
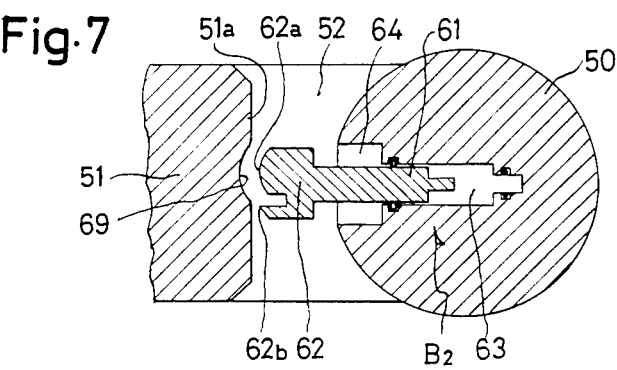
FIG. 7 is a fragmentary sectional view taken along line VII—VII in FIG. 6.

Now, a second embodiment of the invention will be described with reference to FIGS. 6 and 7.

Referring to the Figures, there is shown an anchor B for hooking, cutting and holding a submarine cable according to the invention. The illustrated anchor has a shape like a fishing hook and comprises an anchor body part 50, a cable-hooking part 51 and a connecting part 52. The anchor body part 50 includes a first piston-cylinder mechanism B1 extending longitudinally and a second piston-cylinder mechanism B2 extending transversally. The piston-cylinder mechanisms B1 and B2 are communicated with each other by a communication passage 53.

The first piston-cylinder mechanism B1 has a first piston 54 having two portions of different outer diameters a and d for obtaining an oil hydraulic pressure necessary for the generation of cutting and holding cable α by making use of hydraulic sea water pressure, a first cylinder 55, a check valve 56 for checking sea water S, a floating piston 57 facing and spaced apart from the first piston 54 and constituting together with the first piston 54 a pressure storage unit to maintain a substantially constant hydraulic pressure of sea water introduced into the first cylinder 55 irrespective of temperature changes of the anchor B or slight leakage of sea water S or pressure transmission oil O, an air purging plug 58 for setting the first piston 54 to an initial position when using the anchor, a connector 59 to be connected to a cable-searching rope or a preceding stage anchor (neither being shown), and a connector 60 to be connected to a next stage anchor (not shown).

The secnd piston-cylinder mechanism B2 has a second piston 61 and a second cylinder 63 accommodating the first cylinder 61. The second piston 61 has two portions of different outer diameters a and e for converting the oil hydraulic pressure generated by the first piston 54 into a force for cutting and holding the cable α through the communication passage 53. The second piston 61 has a cutting blade 62 provided at one end for cutting the cable α. The cutting blade 62 has a holding projection 62a for pushing the cable α against a vertical inner wall 51a of the cable-hooking part 51 and a cutting blade portion 52b for cutting the cable α by pushing it against the inner vertical surface 51a of the cable-hooking part 51.

The connecting part 52 has a vertical spring accommodation hole 65 accommodating a coil spring 66. A closure member 67 is screwed into the lower end portion of the spring accommodation hole 65. The coil spring 66 is found between the closure member 67 and a cable-sensing block 68, so that the block 68 is spring-biased to be held at a position, at which the cutting blade 62 is brought into engagement with the block sidewise and perpendicularly.

The inner vertical wall 51a noted above is formed in a portion corresponding to the holding projection 62a of the cutting blade 62 with a recess 69, into which the cable α is pushed.

With the above second embodiment, when the submarine cable α is hooked in the cable-hooking part 51 and the ship is advanced in this state or the cable-searching rope is taken up into the ship, the hooked cable α reaches the cable-sensing block 68 and exerts the same force tending to force it down. When the downward force applied to the block 68, i.e., the tensile force exerted to the anchor B, reaches a preset value, i.e., 100 kg, with which the cable-sensing block 68 is biased, the block 68 is lowered down to the lower end of the cutting blade 62, whereupon the second piston 61 starts to be operated.

The operation of the anchor B according to the invention will now be described in connection with a case where the sea depth is 2,000 m and the force for cutting and holding the cable α is 5 tons.

Now, assuming for the sake of brevity that the small-diameter portion 54a of the first piston 54 and large-diameter portion 61a of the second piston 61 have an equal outer diameter a equal to 2 cm (corresponding to a sectional area of 3.14 cm² which is an area for receiving the sea water pressure of the second piston 61), the outer diameter d of the large-diameter portion 54b of the first piston 54 is:

$$5{,}000 \text{ kg} \div 200 \text{ kg/cm}^2 + 3.14 \text{ cm}^2 = \pi(d \div 2)^2 = 28.14 \text{ cm}^2$$

$$d = 6 \text{ cm}$$

Now, assuming the urging force of the second piston 61 from an instant right before the start till an instant right after the start to be 100 kg, the necessary outer diameter e of the small-diameter portion 61b of the second piston 61 is obtained. In FIG. 6, the force necessary as the leftward thrust of the second piston 61 is 728 kg, i.e., the sum of the aforementioned 100 kg and the force of 200 kg/cm² × 3.14 cm² = 628 kg exerted to the second piston 61 by the sea water pressure to the right. The oil hydraulic pressure obtained from the sea water pressure from the first piston 54 is:

$$200 \text{ kg/cm}^2 \times 28.14 \text{ cm}^2 \div 3.14 \text{ cm}^2 = 1792.4 \text{ kg/cm}^2$$

Figure 8:
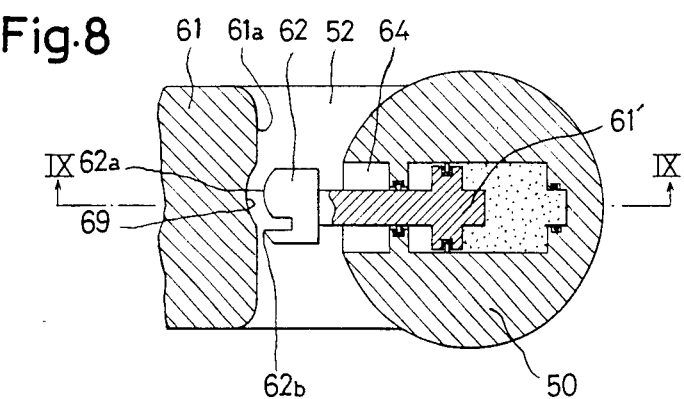
FIG. 8 is a view similar to FIG. 7 but showing a third embodiment of the invention.

Since $\pi(e \div 2)^2 \times 1792.4 \text{ kg/cm}^2 = 728$ kg, we have e = 7 mm When the oil hydraulic pressure is not allowed due to excessive value, the pressure-bearing area of the second piston 61 may be increased like a second piston 61' as shown in FIG. 8, whereby it is possible to reduce the oil hydraulic pressure.

Lastly, the distance l between first piston 54 and floating piston 57 serving as the pressure storage unit is calculated. Supposing the amount of air to the time of the pressure storage (water depth of 2,000 m and cutting/holding force of 200 kg/m²) as 1 cc, under the atmospheric pressure we have $$1 \text{ cc} \times 200 = 200 \text{ cc}$$

so that l = 200 cc ÷ 28.14 cm² = 7.1 cm while standard numerical values have been obtained with respect to the anchor B according to the invention while explaining a method of design of main parts of the anchor B, it will be seen that these numerical values are adequate for the manufacture of use of the anchor and also the dimensions of various parts are in adequate ranges even when the maximum urging force is varied.

Thus, according to the invention it is possible to provide an anchor for hooking, cutting and holding a submarine cable, which is simple in construction and small in size so that it permits connection of a plurality of anchors in series, and also which has high cable-hooking probability with respect to any kind of sea bed condition and has high freedom in designing of various parts and can be most suitably used for water depths of 500 m or above.

Figure 10:
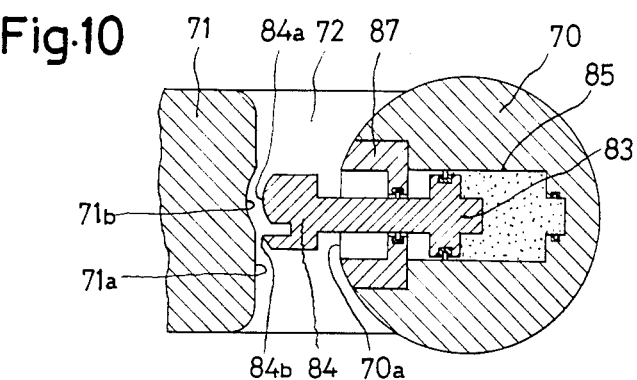
FIG. 10 is a sectional view taken along line X—X in FIG. 9 but showing a further embodiment of the invention.
Figure 9:
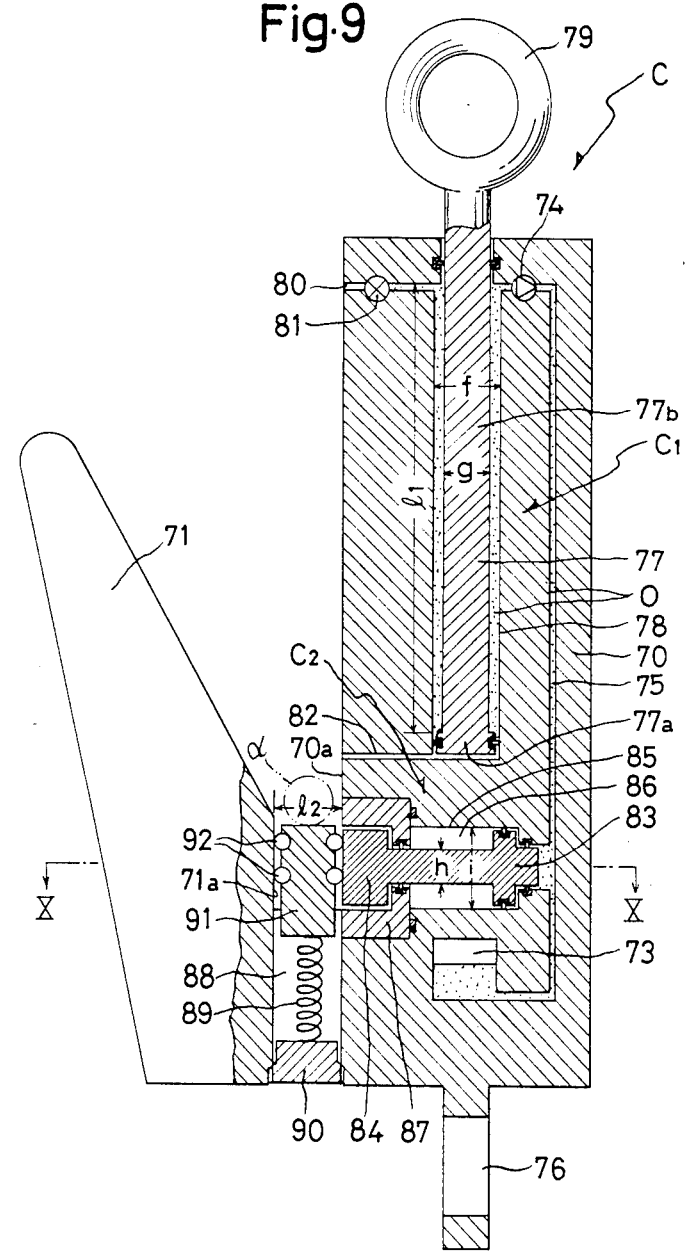
FIG. 9 is a fragmentary sectional view taken along line IX—IX in FIG. 8 showing a cutting blade advanced out.

Now, a third embodiment of the invention will be described with reference to FIGS. 9 and 10.

Referring to the figures, there is shown an anchor C for hooking, cutting and holding a submarine cable according to the invention. The illustrated anchor has a shape like a fishing hook and comprises an anchor body part 70, a cable-hooking part 71 and a connecting part 72 connecting the parts 71 and 72. The anchor body part 70 has a first piston-cylinder mechanism C1 extending longitudinally, a second piston-cylinder mechanism C2 extending transversally and a pressure storage unit 73. These mechanisms C1 and C2 and unit 73 are interconnected by a communication passage 75 provided with a check valve 74 for checking oil O.

Reference numeral 76 designates a connector to be connected to a next stage anchor (not shown).

The first piston-cylinder mechanism C1 has a first piston 77 having a head 77a with a diameter of f cm, a rod 77b with a diameter of g cm, a stroke length of l1 cm for converting the tensile force into oil hydraulic pressure, a first cylinder 78 with the bore diameter of f cm, a loop connector 79 integral with an end of the first piston rod 77b projecting to the outside of the anchor body part 70 and to be connected to a cable-searching rope or a preceding stage anchor (neither being shown), an oil inlet port 80 with a seal valve 81 and a communication passage 82 communicating the bottom of the first cylinder 78 with the outside.

The second piston-cylinder mechanism C2 has a second piston 83 and a second cylinder 85. The second piston 83 has two stages with respective diameters of h and i cm and a stroke length of l2 cm. It has a cutting blade 84 provided at one end for cutting cable α. Reference numeral 86 designates a water-tight space provided for the operation of the second piston 83. The cutting blade 84 has a holding projection 84a for pushing the cable α against an inner vertical surface 71a of the cable-hooking part 71 and a blade portion 84b extending parallel to the holding projection 84a for cutting the cable α by pushing it against the inner vertical surface 71a of the cable-hooking part 71. The cutting blade 84 can be moved from and retreated into a recessed member 87 buried in the inner wall 70a of the anchor body member 70. The connecting part 72 has a longitudinal spring accommodation hole 88 accommodating a coil spring 89. A closure member 90 is screwed into the lower end portion of the spring accommodation hole 88. The coil spring 89 is found between the closure member 90 and a cable-sensing block 91 with rolls 92 provided on an upper portion of the outer periphery, so that the block 91 is spring-biased to be held at a position, at which the cutting blade 84 is brought into engagement with the block 91 sidewise and perpendicularly.

In the cable-hooking part 71, the inner vertical wall 71a is formed in a portion corresponding to the holding projection 84a of the cutting blade 84 with a recess 71b, into which the cable α is urged.

The pressure storage unit 73 is provided in order to maintain the urging force, with which the cable α is held in the recess 71b by the holding projection 84a and also restrict the maximum urging force to prevent rupture of the cable α.

The operation of the anchor C according to the invention will now be described in connection with a case, in which the tension exerted to the anchor C, i.e., the withdrawing force acting on the first piston rod 77b via the loop connector 79, is increased to five times to provide the urging force, with which to cut and hold the cable α and the maximum urging force applied to the cable α is set to 5 tons. The description will be made in conformity to the actual design.

With the above construction of the anchor C, when the submarine cable α is hooked in the cable-hooking part 71 and the ship is advanced in this state or the cable-searching rope is taken up into the ship, the hooked cable α reaches the cable-sensing block 91 and exerts a downward force to the block 91. When the downward force applied to the cable-sensing block 91, i.e., the tension exerted to the anchor C, reaches a preset biasing force value, e.g., 100 kg, the cable-sensing block 91 is forcibly lowered down to the lower end of the cutting blade 84, whereupon the second piston 83 starts to be operated.

The force applied to the cutting blade 83 is an initial stage of the operation of the second piston 83 is generated by the oil hydraulic pressure exerted to the right end surface of the second piston 83, and in the instant example it is equal to the tension exerted to the anchor C when the water depth is 230 m or more.

When the second piston 83 is slightly moved to the left, the area receiving the oil hydraulic pressure of the second piston 83 becomes $\pi(i/2)^2$.

The diameter of each of the pistons 77 and 83 that is necessary for providing the force of cutting and holding the cable α now will be obtained by increasing the tension applied to the anchor C to five times. In this case, the necessary pressure-bearing area of the second piston 83 is five times that of the first piston 77, i.e., $$5\{\pi(f/2)^2 - \pi(g/2)^2\} = \pi(i/2)^2 \qquad \ldots (1)$$

To make the force for cutting and holding the cable α independent of the water depth, the areas of the pistons 77 and 83 for receiving the sea water pressure are made equal to $$\pi(f/2)^2 - \pi(g/2)^2 = \pi(h/2)^2 \qquad \ldots (2)$$

By setting g=2 cm and i=3 cm, from the equations (1) and (2) we can obtain h=1.34 cm f=2.4 cm Further, the capacity of the pressure storage unit 73 and stroke l1 of the first piston 77 necessary for setting the maximum urging force are obtained. The pressure storage unit 73 serves to restrict the maximum urging force and also maintains a substantially constant urging force with respect to the temperature changes of the anchor A and slight leakage of oil O.

If the maximum urging force is 5 tons and the quantity of compressed air in the pressure storage unit 73 at the time of reaching of the top and bottom dead points by the piston 77 and 83 is 3 cc, the air pressure in the pressure storage unit 73 at this time is $$5 \text{ tons}/\pi(d/2)^2 \approx 700 \text{ kg/cm}^2$$

This value corresponds to the quantity of air under atmospheric pressure of $$3 \text{ cc} \times 700 = 2,100 \text{ cc}$$

This value is the capacity of the pressure storage unit 73.

With the anchor C of this embodiment, the stroke l1 of the first piston 77 can be reduced by sealing the oil inlet port 80 by preliminarily pressurzing air in the pressure storage unit 73 with oil O under a constant pressure poured through the oil inlet port 80. Now, the stroke l1 of the first piston 77 is obtained by setting the pressure of preliminary pressurization in the pressure storage unit 73 to 100 kg/cm² and setting the quantity of air in the pressure storage unit 73 to 21 cc. When the stroke l2 of the second piston 83 is set to 3 cm, the stroke l1 of the first piston 77 for operating the second piston 83 is $$3 \text{ cm} \times 5 = 15 \text{ cm}$$

The stroke l2 necessary for compressing air with the ratings of 100 kg/cm² and 21 cc is $$(21-3) \div \pi\{(f/2)^2 - (g/2)^2\} = 13 \text{ cm}$$

where
f=2.4 cm
g=2 cm
Thus, we have l2=15+13=28 cm while standard numerical values have been obtained with respect to the anchor C according to the invention while explaining a method of design of main parts of the anchor C, it will be seen that these numerical values are adequate for the manufacture and use of the anchor and also the dimensions of various parts are in adequate ranges even when the maximum urging force is varied.

Thus, according to the invention it is possible to provide an anchor for hooking, cutting and holding a submarine cable, which is simple in construction and small in size so that it permits connection of a plurality of anchors in series, and also which has high cable-capturing probability with respct to any sea bed character and has high freedom of design of various parts and can be most suitably used irrespective of the water depth, particularly for shallow sea beds.

What is claimed is:

1. An anchor for hooking, cutting and holding an underwater marine cable, comprising a body means having a hook-like configuration in that said body means has a cable-receiving channel which leads to a closed end such that in hooking a cable, the cable moves along said channel to said closed end, cable-responsive means mounted on said body means at said closed end and operable to be engaged by a cable which has been hooked, cutter-gripping means mounted on said body means for cutting said hooked cable and for gripping one end of the cut cable such that said gripped one end of said cable can be raised by said anchor, and cylinder-piston means operably connected between said cable-responsive means and said cutter-gripper means for utilizing the ambient liquid pressure as a source of power for powering said cutter-gripping means to effect a cutting action on a hooked cable upon being actuated by said cable-responsive means, said cylinder-piston means comprising buffering means utilizing a compressible gas medium for buffering the effect of the ambient liquid pressure applied to said cutter-gripping means during said cutting action.

2. An anchor according to claim 1 wherein said cylinder-piston means comprises a cylinder, a first passage in said body means leading to one end of said cylinder, a second passage in said body means leading to the other end of said cylinder, a valve means in said first passage for admitting ambient liquid into said one end of said cylinder, and a first piston having a piston rod reciprocably mounted in said cylinder, said piston rod extending into said second passage.

3. An anchor according to claim 2 wherein said cylinder-piston means further comprises a second piston reciprocably mounted in said cylinder between said one end of said cylinder and said first piston, said ambient liquid which is admitted to said cylinder through said first passage acting on said second piston.

4. An anchor according to claim 3 wherein said first piston is longitudinally spaced from said second piston, said compressible gas medium being disposed in said cylinder between said first and second pistons.

5. An anchor according to claim 2 further comprising means operably connecting said valve means to said cable-responsive means.

6. An anchor according to claim 2 wherein said buffering means comprises a valve in said body means for purging air from said cylinder between said first piston and said other end of said cylinder.

7. An anchor according to claim 2 wherein said cable-responsive means is operatively connected to said valve means to open the latter to amit ambient liquid to said cylinder when said cable-responsive means is actuated by a hooked cable.

8. An anchor according to claim 7 wherein said cable-responsive means comprises a lever pivotably mounted on said body means, said pivotable lever being engaged by said cable when said cable is hooked to pivot said lever from an non-actuated to an actuated position.

9. An anchor according to claim 1 wherein said cutter-gripper means comprises a knife means for cutting said cable and a pawl pivotably mounted on said knife means for engaging and gripping said one end of said cable.

10. An anchor for hooking, cutting and holding a marine cable comprising a body means having a hook-like configuration in that said body means has a cable-receiving channel which leads to a closed end such that in hooking a cable, the cable moves along said channel to said closed end, cable-responsive means mounted on said body means at said closed end and operable to be engaged by a cable which has been hooked, cutter-gripping means mounted on said body means for cutting said hooked cable and for gripping one end of the cut cable such that said gripped one end of said cable can be raised by said anchor, and cylinder-piston means utilizing a liquid and having a passage means for said liquid leading to said cutter-gripper means for powering said cutter-gripping means to effect a cutting action on a hooked cable upon being actuated by said cable-responsive means, said cable-responsive means comprising an elongated accommodation hole in said body means and having a longitudinal axis, a cable-sensing block reciprocably mounted in said accommodation hole, biasing means in said accommodation hole biasingly urging said cable-sensing block to a non-actuated position such that when a cable is hooked, the hooked cable moves said cable-sensing block in said accommodating hole from said non-actuated position to an actuated position, said cutter-gripping means further comprising a cutter-gripper part movable along a linear path between a non-actuated and an actuated position, said linear path being perpendicular to said longitudinal axis of said accommodation hole, said cutter-gripper part engaging said cable-sensing blck when said cutter-gripper part and said cable-sensing block are in their non-actuated positions.

11. An anchor according to claim 10 wherein said cylinder-piston means comprises a first cylinder, a first passage in said body means leading to one end of said first cylinder, a second passage in said body means leading to the other end of said first cylinder, a valve means in said first passage for admitting ambient liquid into said one end of said first cylinder, and a first piston having a piston rod reciprocably mounted in ssaid first cylinder, said piston rod extending into said second passage, said cylinder-piston means also comprising a second piston reciprocably mounted in said first cylinder between said one end of said first cylinder and said first piston, said ambient liquid which is admitted to said first cylinder through said first passage actig on said second piston, said cylinder-piston means further comprising a second cylinder in said body means and a third piston operable in said second cylinder, said second passage extending between said first and second cylinder, said second cylinder having a smaller diameter than said first cylinder, said piston rod operating in a portion of said second passage, said second passage containing a captured liquid medium such that said piston rod acts on said captured liquid medium to operate said third piston, said third piston being operably connected to said cutter-gripping means.

12. An anchor according to claim 11 wherein the axis of said first cylinder is perpendicular to the axis of said second cylinder.

13. An anchor according to claim 10 wherein said cable-responsive means comprises an elongated accommodation hole in said body means and having a longitudinal axis, a cable-sensing block reciprocably mounted in said accomodating hole, and biasing means in said accommodation hole biasingly urging said cable-sensing block to a non-actuated position such that when a cable is hooked, the hooked cable moves said cable-sensing block in said accommodating hole from said non-actuated position to an actuated position.

14. An anchor according to claim 13 wherein said cutter-gripping means comprises a cutter-gripper part movable along a linear path between a non-actuated and an actuated position, said linear path being perpendicular to said longitudinal axis of said accommodation hole.

15. An anchor according to claim 14 wherein said cutter-gripper part engages said cable-sensing block when said cutter-gripper part and said cable-sensing block are in their non-actuated positions.

16. An anchor according to claim 14 wherein said cutter-gripper part pushes said hooked cable against a side of said accommodation hole when said cutter-gripper part is in said actuated position.

17. An anchor according to claim 11 wherein said second cylinder has a first and a second portion, said first portion having a smaller diameter than said second portion, said third piston having a first and second section, said first section having a smaller diameter than said second section, said second passage leading to said first cylinder portion of smaller diameter such that the pressure applied by said piston rod to said captured liquid medium in said second passage acts on said smaller diameter first section of said third piston.

18. An anchor according to claim 10 wherein said cable-responsive means further comprises rolling means between said accommodation hole and said cable-sensing block.

19. An anchor connected to an anchor line and operable for hooking, cutting and holding a marine cable, comprising a body means having a hook-like configuration in that said body means has a cable-receiving channel which leads to a closed end such that in hooking a cable, the cable moves along said channel to said closed end, cable-responsive means mounted on said body means at said closed end and operable to be engaged by a cable which has been hooked, cutter-gripping means mounted on said body means for cutting said hooked cable and for gripping one end of the cut cable such that said gripped one end of said cable can be raised by said anchor, and cylinder-piston means utilizing a captured liquid medium and having a passage means for said liquid medium leading to said cutter-gripper means for powering said cutter-gripping means to effect a cutting action on a hooked cable upon being actuated by said cable-responsive means, said cylinder-piston means comprising pull means for connecting the anchor to an anchor line and operable to utilize the pulling force of the anchor line to increase the pressure of the captured liquid medium in said cylinder-pressure means, whereby the pulling force on said anchor line is utilized in effecting cutting of said hooked cable.

20. An anchor according to claim 19 wherein said cylinder-piston means comprises a first cylinder in said body means and a first piston operable in said first cylinder, said pull means being connected to said first piston such that the pulling force of the anchor line operates the first piston in said first cylinder to increase the pressure of the captured liquid medium in said cylinder-piston means.

21. An anchor according to claim 20 wherein said cylinder-piston means further comprises a first passage in said body means leading from said first cylinder to the ambient liquid so that the latter acts on said first piston to apply the pressure of the ambient liquid to said first piston.

22. An anchor according to claim 20 wherein said cylinder-piston means comprises a second cylinder in said body means, a second piston operable in said second cylinder, said passage, means extending between said first and second cylinders.

23. An anchor according to claim 21 wherein said first piston divides said first cylinder into a first section containing said captured liquid medium and a second side receiving ambient liquid via said first passage.

24. An anchor according to claim 22 further comprising buffering means on said body means for buffering the effect of the liquid pressure applied to said cutter-gripping means, said buffering means comprising a pressure storage tank in said body means, said pressure storage tank containing a captured compressible gas medium, said pressure storage tank communicating with said passage means.

* * * * *